(12) United States Patent
Itou (10) Patent No.: US 7,447,632 B2
(45) Date of Patent: Nov. 4, 2008

(54) VOICE AUTHENTICATION SYSTEM

(75) Inventor: Taisuke Itou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/237,691

(22) Filed: Sep. 29, 2005

(65) Prior Publication Data

US 2006/0020460 A1    Jan. 26, 2006

Related U.S. Application Data

(63) Continuation of application No. PCT/JP03/09768, filed on Jul. 31, 2003.

(51) Int. Cl.
*G10L 17/00* (2006.01)

(52) U.S. Cl. .................. 704/247; 704/273; 704/246

(58) Field of Classification Search ................ 704/231, 704/246, 239, 240, 270, 270.1, 243, 250, 704/257, 273, 247; 379/88.22

See application file for complete search history.

(56) References Cited

U.S. PATENT DOCUMENTS 5,915,001 A * 6/1999 Uppaluru ................ 379/88.22
6,477,500 B2 * 11/2002 Maes ........................ 704/275

FOREIGN PATENT DOCUMENTS

| JP | 59-178700 | 11/1984 |
| JP | 62-27398 | 6/1987 |
| JP | 2001-22385 | 1/2001 |
| JP | 2001-265387 | 9/2001 |
| JP | 2002-304379 | 10/2002 |

* cited by examiner

*Primary Examiner*—Huyen X. Vo
(74) *Attorney, Agent, or Firm*—Staas & Halsey LLP (57) ABSTRACT

A voice authentication system includes: a standard template storage part 17 in which a standard template that is generated from a registered voice of an authorized user and featured with a voice characteristic of the registered voice is stored preliminarily in a state of being associated with a personal ID of the authorized user; an identifier input part 15 that allows a user who intends to be authenticated to input a personal ID; a voice input part 11 that allows the user to input a voice; a standard template/registered voice selection part 16 that selects a standard template and a registered voice corresponding to the inputted identifier; a determination part 14 that refers to the selected standard template and determines whether or not the inputted voice is a voice of the authorized user him/herself and whether or not presentation-use information is to be outputted by referring to a predetermined determination reference; a presentation-use information extraction part 19 that extracts information regarding the registered voice of the authorized user corresponding to the inputted identifier; and a presentation-use information output part 18 that presents the presentation-use information to the user in the case where it is determined by the determination part that the presentation-use information is to be outputted to the user.

9 Claims, 5 Drawing Sheets

VOICE AUTHENTICATION SYSTEM

This application is a continuing application, filed under 35 U.S.C. §111(a), of International Application PCT/JP2003/009768, filed Jul. 31, 2003.

TECHNICAL FIELD

The present invention relates to a voice authentication system that urges a person to input his/her voice and matches the input voice with the speaker's preliminarily registered voice so as to determine whether or not the input voice is identified as a voice of the authorized person him/herself, and particularly relates to a so-called text-dependent voice authentication system for the authentication of personal identification by using the same speech content upon the registration and the authentication.

BACKGROUND ART

Recently, as commercial transactions and service use via networks have prevailed, attention has been given to biometric authentication for authenticating personal identification by utilizing information peculiar to an individual such as physical characteristics instead of a keyword or a personal identification number, as a method for protection against "disguise". One of examples of such biometric authentication is voice authentication.

Further, as one of the voice authentication methods, a so-called text-dependent voice authentication method is known, which is a method in which personal identification is authenticated by utilizing the same speech content at the times of registration and authentication. The text-dependent voice authentication utilizes, at the time of authentication, a speech content that was registered at the time of registration. This method also is called "password method", "keyword method", or "key phrase method". In the text-dependent voice authentication, a voice speaking a preliminarily determined speech content (keyword) or a speech content that an authorized user has determined freely for him/herself is registered in a system. When a person who intends to be authenticated inputs the keyword with voice, the personal identification is authenticated depending on whether or not characteristics of the input voice match the characteristics of the voice registered as the voice of the foregoing person. Here, in some cases, whether or not the speech content of the input voice matches the registered speech content is checked.

For instance, as a conventional example of the text-dependent voice authentication, JP-2002-304379-A discloses a system for personal authentication configured as follows. Regarding each of persons who intend to be authenticated, a plurality of words and a set of voiceprint data obtained when making the foregoing person utter the foregoing words are stored in a memory medium in advance. Any one of the plurality of words corresponding to ID data inputted by a person who intends to be authenticated and voiceprint data corresponding to it are selected, and the word is presented before the person so as to urge him/her to utter it. His/her voiceprint is analyzed and is matched with the voiceprint data preliminarily stored. By so doing, personal authentication of the person who intends to be authenticated is performed.

Here, the conventional voice authentication method is described with reference to FIGS. 5 and 6.

Figure 5:
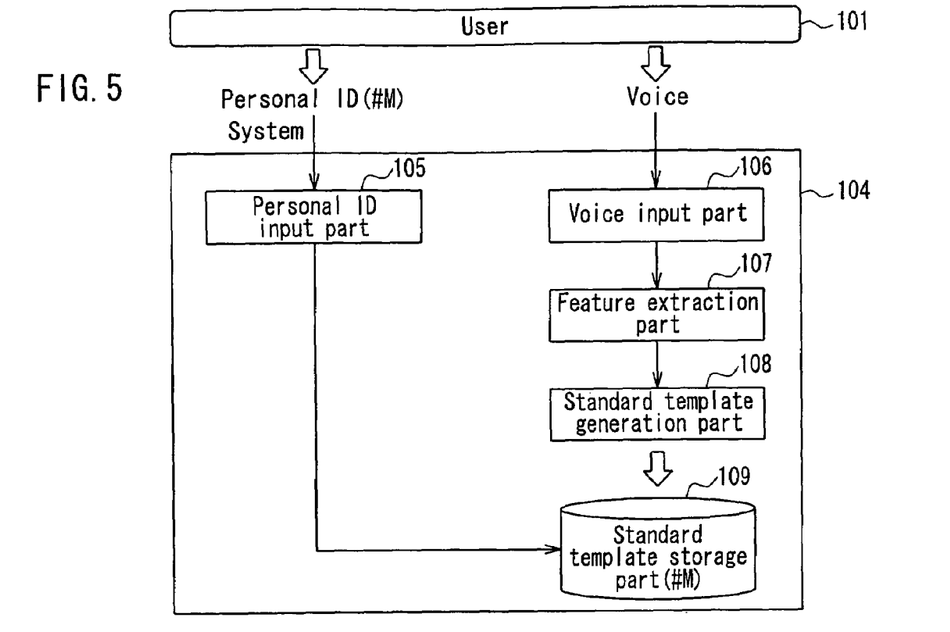
FIG. 5 is a block diagram illustrating a schematic configuration of a conventional voice registration system for generating and registering a standard template for voice authentication.

FIG. 5 illustrates a schematic configuration of a conventional voice registration system for generating and registering standard templates for voice authentication. As shown in FIG. 5, in the conventional voice registration system 104, when a user 101 registered as an authorized user utters an input voice toward a voice input part 106, and a feature extraction part 107 converts the input voice into a time series of feature parameters, and a standard template generation part 108 generates a standard template. The generated standard template is stored in a standard template storage part 109, in a state of being associated with personal identification data (ID) (#M in the example shown in FIG. 5) that is allocated to the user.

Figure 6:
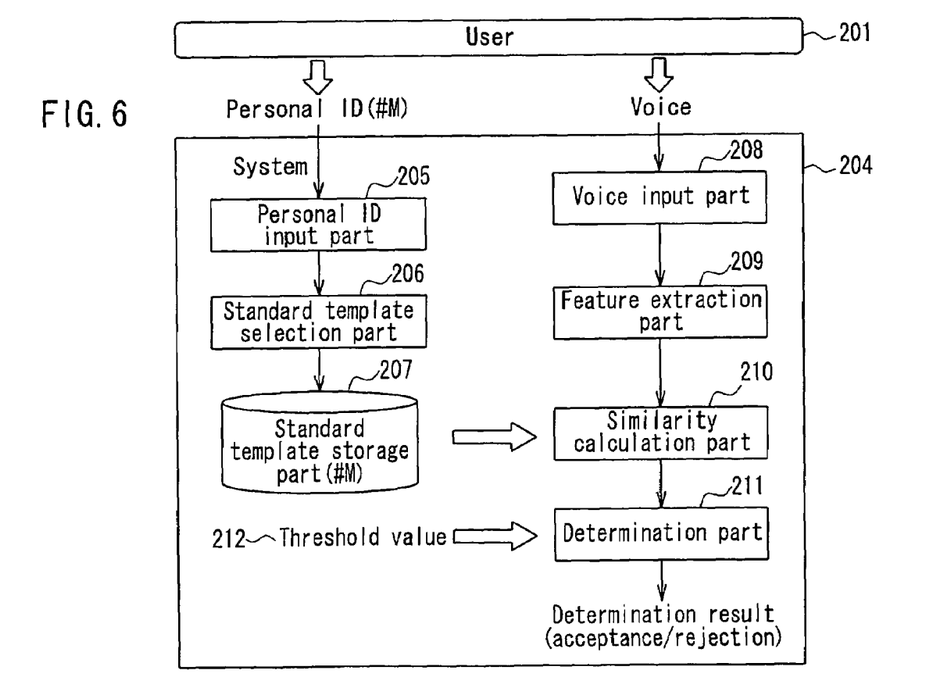
FIG. 6 is a block diagram illustrating a schematic configuration of a conventional voice authentication system that utilizes registered voices of authorized users that have been registered by the voice registration system shown in FIG. 5.

FIG. 6 illustrates a schematic configuration of a conventional voice authentication system that utilizes registered voices of authorized users that have been registered by the voice registration system shown in FIG. 5. A standard template storage part 207 in the foregoing authentication system 204 stores data of the standard template storage part 109 of the voice registration system 104, i.e., standard templates associated respectively with personal IDs of authorized users.

As shown in FIG. 6, at the time of authentication, a user 201 intending to be authenticated inputs a personal ID (#M in the example shown in FIG. 6) in a personal ID input part 205 of the authentication system 204, and inputs a voice in a voice input part 208. The voice thus inputted is converted into a time series of feature parameters by a feature extraction part 209. The personal ID thus inputted is sent to a standard template selection part 206. The standard template selection part 206 selects a standard template corresponding to the personal ID thus inputted from the standard template storage part 207, and sends the same to a similarity calculating part 210.

The similarity calculation part 210 calculates a similarity of the time series of the feature parameters obtained by the feature extraction part 209 to the standard template selected by the standard template selection part 206. A determination part 211 compares the calculated similarity with a preliminarily set threshold value, so as to determine whether to accept the user 201 by confirming his/her identity or to reject the user 201 as another person, and outputs the determination result.

In the case where the text-dependent voice authentication method is adopted, at the time of registering a voice to the voice registration system 104, either the voice registration system or each user determines a keyword and the user utters the keyword so that it is registered. Then, at the time of authentication, the user utters the keyword that he/she memorizes, so as to be authenticated.

However, in the case where time has passed since the voice registration was carried out to the voice registration system until the authentication system is utilized actually, a change of utterance possibly has occurred even to a registered person him/herself. The change of utterance refers to changes in information such as a pitch frequency, an intonation, a power, a speaking rate, a spectrum, etc. of a voice. The change of utterance causes the similarity calculated by the similarity calculation part 210 to decrease, and consequently it frequently happens that a person who should correctly be identified is determined as another person falsely. Thus, the authentication precision deteriorates because utterance of a keyword at the time of authentication has been transformed as compared with the utterance of the keyword at the time of registration, and this problem has been a pending problem of the text-dependent voice authentication method since before.

DISCLOSURE OF THE INVENTION

In light of the foregoing problem, it is an object of the present invention to provide a text-dependent voice authentication system that presents information about a registered voice to a user who intends to be authenticated, so as to allow the user to reproduce utterance close to the registered voice at the time of authentication, whereby the authentication precision is improved.

To achieve the above-described object, a voice authentication system according to the present invention is characterized by including: a standard template storage part in which a standard template that is generated from a registered voice of an authorized user and featured with a voice characteristic of the registered voice is stored preliminarily in a state of being associated with an identifier of the authorized user; an identifier input part that allows a user who intends to be authenticated to input an identifier; a voice input part that allows the user who intends to be authenticated to input a voice; a standard template selection part that selects, from the standard template storage part, a standard template corresponding to the identifier inputted through the identifier input part; a determination part that refers to the standard template selected by the standard template selection part, and determines whether or not the voice inputted through the voice input part is a voice of the authorized user him/herself and whether or not presentation-use information is to be outputted by referring to a predetermined determination reference; a presentation-use information extraction part that extracts information regarding a registered voice of the authorized user corresponding to the identifier inputted through the identifier input part, as presentation-use information to be presented to the user who intends to be authenticated; and a presentation-use information output part that outputs the presentation-use information to the user who intends to be authenticated, wherein the presentation-use information is information obtained from the registered voice of the authorized user corresponding to the identifier inputted through the identifier input part, and is different from information used as the determination reference by the determination part, and in the case where it is determined by the determination part that the presentation-use information is to be outputted, the presentation-use information extraction part extracts the presentation-use information, and the presentation-use information output part outputs the presentation-use information thus extracted.

With the foregoing configuration, even if a change of utterance has occurred because of elapse of time since the voice registration, by presenting information relating to a registered voice at the time of authentication, a user who intends to be authenticated is allowed to easily reproduce utterance close to the utterance at the time of registration by referring to the foregoing information. This increases the similarity of the input voice. Further, since the presentation-use information is information obtained from the registered voice of the authorized user corresponding to the identifier inputted through the identifier input part and is different from information used as the determination reference by the determination part, the rate of acceptance by personal identification can be improved without decreasing the rate of rejection of another person. Therefore, this improves the authentication precision.

In the foregoing voice authentication system, the presentation-use information preferably includes at least one selected from the group consisting of information regarding the voice characteristic of the registered voice of the authorized user corresponding to the identifier inputted through the identifier input part, a signal containing information of a pitch frequency of the registered voice, a signal containing phonetic information of the said registered voice, a signal containing information of a power of the registered voice, a signal containing information of a speaking rate, and a text describing a speech content of the registered voice of the authorized user corresponding to the identifier inputted through the identifier input part.

In the voice authentication system, information of a spectrum envelope of a voice can be used as the voice characteristic used by the determination part as the determination reference.

In the voice authentication system, it is preferable that after authentication of personal identification fails and the presentation-use information is outputted to the user by the presentation-use information output part, the user is urged to input a voice again through the voice input part, and when determination is performed again by the determination part based on the voice thus inputted again, a threshold value as the determination reference is set so as to be a predetermined value higher than that at the previous determination.

In the voice authentication system, it is preferable that the presentation-use information extraction part selects and extracts presentation-use information to be presented to the user, from a plurality of types of presentation-use information, and the determination part has determination references corresponding to the types of the presentation-use information, respectively, and alters the determination reference that the determination part refers to, according to the type of the presentation-use information extracted by the presentation-use information extraction part.

It should be noted that in the foregoing configuration, the user may be allowed to select and input a type of the presentation-use information that the user requests and the presentation-use information extraction part selects and extracts the presentation-use information according to the selection/input result thus made, or alternatively, the presentation-use information extraction part may select a type of the presentation-use information according to a predetermined rule or at random.

To achieve the above-described object, a voice authentication method according to the present invention is characterized by including: an operation of allowing a user who intends to be authenticated to input an identifier; an operation of allowing the user who intends to be authenticated to input a voice; a determination operation of selecting a standard template corresponding to the inputted identifier, from a standard template storage part in which a standard template that is generated from a registered voice of an authorized user and featured with a voice characteristic of the registered voice is stored preliminarily in a state of being associated with an identifier of the authorized user, referring to the selected standard template, and determining whether or not the inputted voice is a voice of the authorized user him/herself and whether or not presentation-use information is to be outputted by referring to a predetermined determination reference; a presentation-use information extraction operation of extracting information regarding a registered voice of the authorized user corresponding to the inputted identifier, as presentation-use information to be presented to the user who intends to be authenticated; and a presentation-use information output operation of outputting the presentation-use information extracted in the presentation-use information extraction operation to the user who intends to be authenticated, in the case where it is determined by the determination operation that the presentation-use information is to be outputted, wherein the presentation-use information is information obtained from the registered voice of the authorized user corresponding to the inputted identifier, and is different from information used as the determination reference in the determination operation.

In the voice authentication method, the presentation-use information extraction operation and the presentation-use information output operation may be performed before the user who intends to be authenticated is urged to input a voice first, or may be performed after it is determined by the determination operation based on his/her voice inputted first that the voice is not a voice of the authorized user him/herself.

Further, to achieve the above-described object, a computer program according to the present invention is characterized by including an instruction for causing a computer to execute: an operation of allowing a user who intends to be authenticated to input an identifier; an operation of allowing the user who intends to be authenticated to input a voice; a determination operation of selecting a standard template corresponding to the inputted identifier, from a standard template storage part in which a standard template that is generated from a registered voice of an authorized user and featured with a voice characteristic of the registered voice is stored preliminarily in a state of being associated with an identifier of the authorized user, referring to the selected standard template, and determining whether or not the inputted voice is a voice of the authorized user him/herself and whether or not presentation-use information is to be outputted by referring to a predetermined determination reference; a presentation-use information extraction operation of extracting information regarding a registered voice of the authorized user corresponding to the inputted identifier, as presentation-use information to be presented to the user who intends to be authenticated; and a presentation-use information output operation of outputting the presentation-use information extracted in the presentation-use information extraction operation to the user who intends to be authenticated, in the case where it is determined by the determination operation that the presentation-use information is to be outputted, wherein the presentation-use information is information obtained from the registered voice of the authorized user corresponding to the inputted identifier, and is different from information used as the determination reference in the determination operation.

Still further, to achieve the above-described object, a computer-readable recording medium according to the present invention in which a computer program is recorded is characterized by including an instruction for causing a computer to execute: an operation of allowing a user who intends to be authenticated to input an identifier; an operation of allowing the user who intends to be authenticated to input a voice; a determination operation of selecting a standard template corresponding to the inputted identifier, from a standard template storage part in which a standard template that is generated from a registered voice of an authorized user and featured with a voice characteristic of the registered voice is stored preliminarily in a state of being associated with an identifier of the authorized user, referring to the selected standard template, and determining whether or not the inputted voice is a voice of the authorized user him/herself and whether or not presentation-use information is to be outputted by referring to a predetermined determination reference; a presentation-use information extraction operation of extracting information regarding a registered voice of the authorized user corresponding to the inputted identifier, as presentation-use information to be presented to the user who intends to be authenticated; and a presentation-use information output operation of outputting the presentation-use information extracted in the presentation-use information extraction operation to the user who intends to be authenticated, in the case where it is determined by the determination operation that the presentation-use information is to be outputted, wherein the presentation-use information is information obtained from the registered voice of the authorized user corresponding to the inputted identifier, and is different from information used as the determination reference in the determination operation.

DESCRIPTION OF THE INVENTION

The following describes embodiments of the present invention in detail while referring to the drawings.

EMBODIMENT 1

Figure 1:
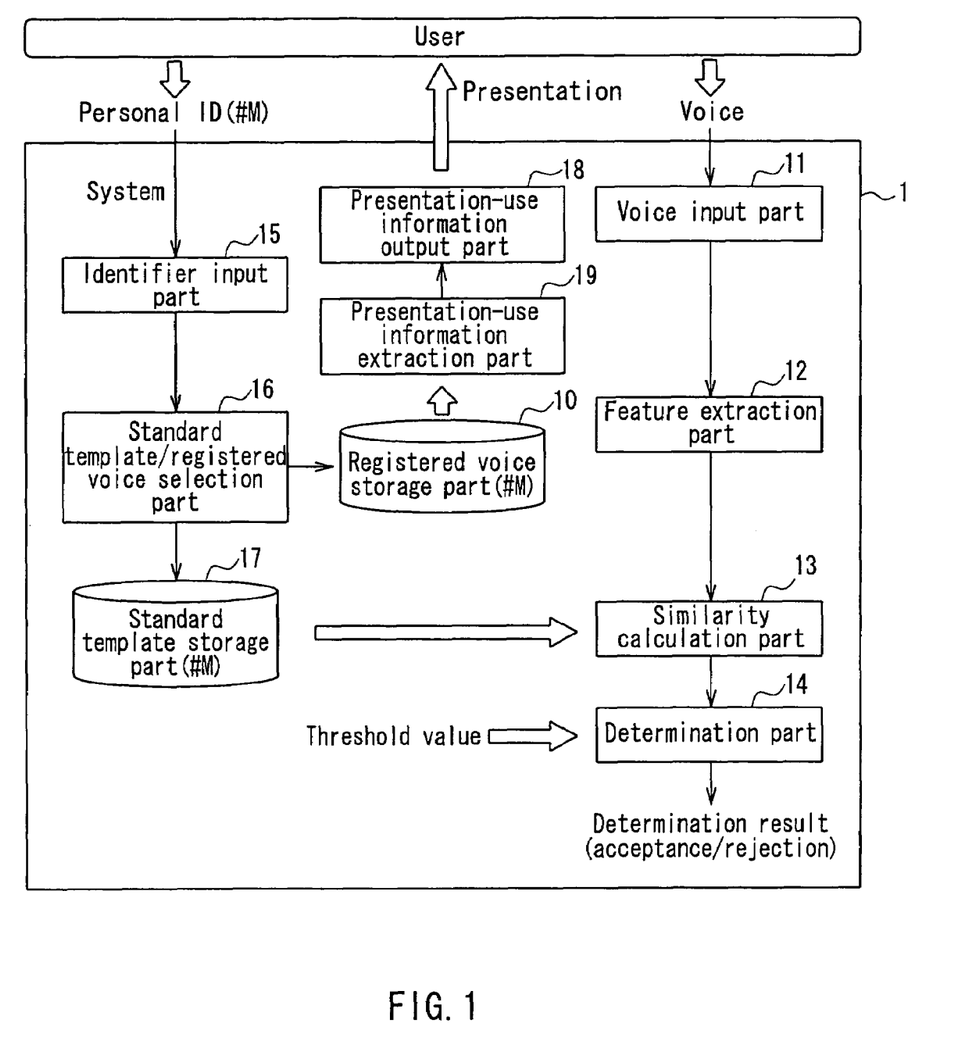
FIG. 1 is a block diagram illustrating a configuration example of a voice authentication device according to an embodiment of the present invention.

FIG. 1 is a block diagram illustrating a configuration example of a voice authentication device according to an embodiment of the present invention.

As shown in FIG. 1, a voice authentication system according to the present embodiment is a text-dependent voice authentication device configured so that by referring to both a speech content and voice characteristics of a voice inputted by a user, the device determines whether or not the foregoing input voice is a voice of a person who is registered preliminarily as an authorized user, so as to perform authentication of personal identification. Accordingly, the voice authentication device includes a registered voice storage part 10, a voice input part 11, a feature extraction part 12, a similarity calculation part 13, a determination part 14, an identifier input part 15, a standard template/registered voice selecting part 16, a standard template storage part 17, a presentation-use information output part 18, and a presentation-use information extraction part 19.

It should be noted that FIG. 1 illustrates an example of a voice authentication system according to the present invention that is configured as a piece of hardware in one box (voice authentication device), but the voice authentication system of the present invention may be composed of a plurality of pieces of hardware. In the latter case, for instance, the voice input part 11, the identifier input part 15, and the presentation-use information output part 18, which constitute an interface for a user, may be configured as hardware that is directly accessible to the users (for instance, a mobile-phone, a PDA, a personal computer, etc.), which is connected with the other blocks via wireless or wired communication media.

Here, the following describes the functions of the foregoing blocks briefly.

The registered voice storage part 10 stores registered voices of authorized users in a state of being associated with respective identifiers of the users. The standard template storage part 17 stores standard templates generated by registered voices of authorized users. Each standard template is information featured by voice characteristics of a registered voice, which is generated by, for instance, modeling a linear predictive coding (LPC) cepstrum distribution obtained from the registered voice by a method such as the Gaussian Mixture Model (GMM). The standard template may be featured by information of a speech content (text) and voice characteristics of a registered voice.

The voice input part 11 includes, for instance, a microphone, and inputs a voice of a user who intends to be authenticated.

The feature extraction part 12 converts a voice inputted through the voice input part 11 into a time series of feature parameters. The feature parameters obtained by the feature extraction part 12 are information of a spectrum envelope such as a LPC cepstrum or Mel-Frequency Cepstral coefficients (MFCC). In other words, in the case where the LPC cepstrum is used, the feature extraction part 12 obtains a time series of a LPC cepstrum from an input voice. Alternatively, in the case where the MFCC is used, the feature extraction part 12 obtains a time series of MFCC from an input voice.

The similarity calculation part 13 calculates a similarity of the time series of the feature parameters obtained by the feature extraction part 12 with respect to a standard template. For instance, in the case where information of a spectrum envelope of a LPC cepstrum is used as feature parameters, the similarity calculation part 13 calculates a similarity of a LPC cepstrum obtained from an input voice with respect to a standard template of a preliminarily registered, authorized user.

The determination part 14 compares the similarity obtained by the similarity calculation part 13 with a preliminarily set threshold value, and outputs a determination result that is either acceptance of the user by determining that the user is the authorized person him/herself, or rejection of the user by determining that the user is not the authorized person him/herself.

The identifier input part 15 is a portion that allows the user who intends to be authenticated to input an identifier, and can be implemented with push buttons, a keyboard, a touch panel, etc. including a ten key pad and the like. Alternatively, it may be configured so that an identifier is inputted by voice recognition, or may be configured so that an identifier is read in from an information recording medium such as an ID card magnetically, electrically, or optically. It should be noted that as the identifiers, arbitrary identifiers set preliminarily as to the authorized users, respectively, may be used, each of which is composed of any digits, letters, or a combination of the same, provided that it uniquely specify the user concerned. In the present embodiment, personal IDs are used.

The standard template/registered voice selection part 16 selects a standard template corresponding to an identifier inputted via the identifier input part 15 from the standard template storage part 17, and selects a registered voice corresponding to the foregoing identifier from the registered voice storage part 10.

Based on the registered voice of the authorized user corresponding to the identifier inputted through the identifier input part 15, the presentation-use information extraction part 19 generates either information of voice characteristics different from the voice characteristics that are referred to as criteria for the determination by the determination part 14, or a text describing the speech content of the registered voice. This information is information to be presented to the user who intends to be authenticated (hereinafter such information to be presented is referred to as "presentation-use information").

The presentation-use information output part 18 outputs presentation-use information extracted by the presentation-use information extraction part 19 to the user who intends to be authenticated, and the part is implemented with appropriate hardware according to the type of the presentation-use information. For instance, in the case where the presentation-use information can be recognized visually, a display may be used, whereas in the case where the presentation-use information can be recognized acoustically, a speaker may be used. Alternatively, it may be a combination of a display and a speaker.

Examples of the presentation-use information generated based on a registered voice include (1) a signal containing information of a pitch frequency of the registered voice, (2) a signal containing information of a power of the registered voice, (3) a signal containing phonetic information of the registered voice, (4) a signal containing information of a speaking rate of the registered voice, and (5) a text describing a speech content (keyword) of the registered voice.

For instance, the signal containing information of a pitch frequency, i.e., the foregoing (1), can be generated by causing the presentation-use information extraction part 19 to generate a residual signal obtained by performing LPC analysis with respect to the registered voice and filtering the same by using a filter reverse to spectrum. Alternatively, by subjecting the registered voice to pitch extraction, the foregoing information may be generated as a pulse string arranged at a pitch period thus obtained. The pitch extraction can be implemented by a method of using a period of a peak of a high-frequency region of cepstrum extracted from a voice as a pitch period.

By causing a user to listen to such a signal containing information of a pitch frequency as presentation-use information, for instance, the user is allowed to reproduce utterance having a pitch frequency and an intonation close to those at the time of registration. This increases the similarity of the input voice, and hence reduces a possibility of false rejection of the user him/herself.

Further, a signal containing information of a power of a registered voice, i.e., the foregoing (2), can be generated by causing the presentation-use information extraction part 19 to generate a signal that retains information about variation with time of a power of a registered voice (in other words, without manipulation of power information). Here, the other information such as a pitch frequency, phonetic information, etc. may be lost.

By causing a user to listen to (or look at) such a signal containing information about power as presentation-use information, for instance, the user is allowed to reproduce utterance having a power close to that at the time of registration. This increases the similarity of the input voice, and hence reduces a possibility of false rejection of the user him/herself. Further, by forming the presentation-use information so that the information does not contain phonetic information, an advantage of concealing a keyword is obtained.

Still further, a signal containing phonetic information of a registered voice, i.e., the foregoing (3), is obtained by, for instance, causing the presentation-use information extraction part 19 to obtain a speech content (keyword) of the registered voice by voice recognition and perform speech synthesis by rule according to the keyword. Alternatively, it may be obtained by extending/contracting a spectrum obtained by Fourier transformation of the registered voice along the frequency axis so as to subject the same to inverse Fourier transformation. Alternatively, the foregoing signal can be obtained by another method of performing pitch extraction with respect to the registered voice and extending/contracting one pitch waveform along the time axis.

By causing a user to listen to such a signal containing phonetic information of a registered voice as presentation-use information, the user is allowed to reproduce utterance having the same phonemes as those at the time of registration. This increases the similarity of the input voice, and hence reduces a possibility of false rejection of the user him/herself.

Still further, a signal containing information of a speaking rate of a registered voice, i.e., the foregoing (4), may be obtained by causing the presentation-use information extraction part 19 to produce, for instance, a signal that retains information of a speaking rate of the registered voice (in other words, that is not subjected to extending/contracting along the time axis). Here, other information such as a pitch frequency, phonetic information, etc. may be lost.

By causing a user to listen to such a signal containing a speaking rate of a registered voice as presentation-use information, the user is allowed to utter at the same speed as the speed at the time of registration. This increases the similarity of the input voice, and hence reduces a possibility of false rejection of the user him/herself.

Further, by showing a text describing a speech content (keyword) of a registered voice, i.e., the foregoing (5), a possibility of false rejection of the user him/herself is reduced even if the authorized user him/herself has forgotten the keyword of the registered voice.

Figure 2:
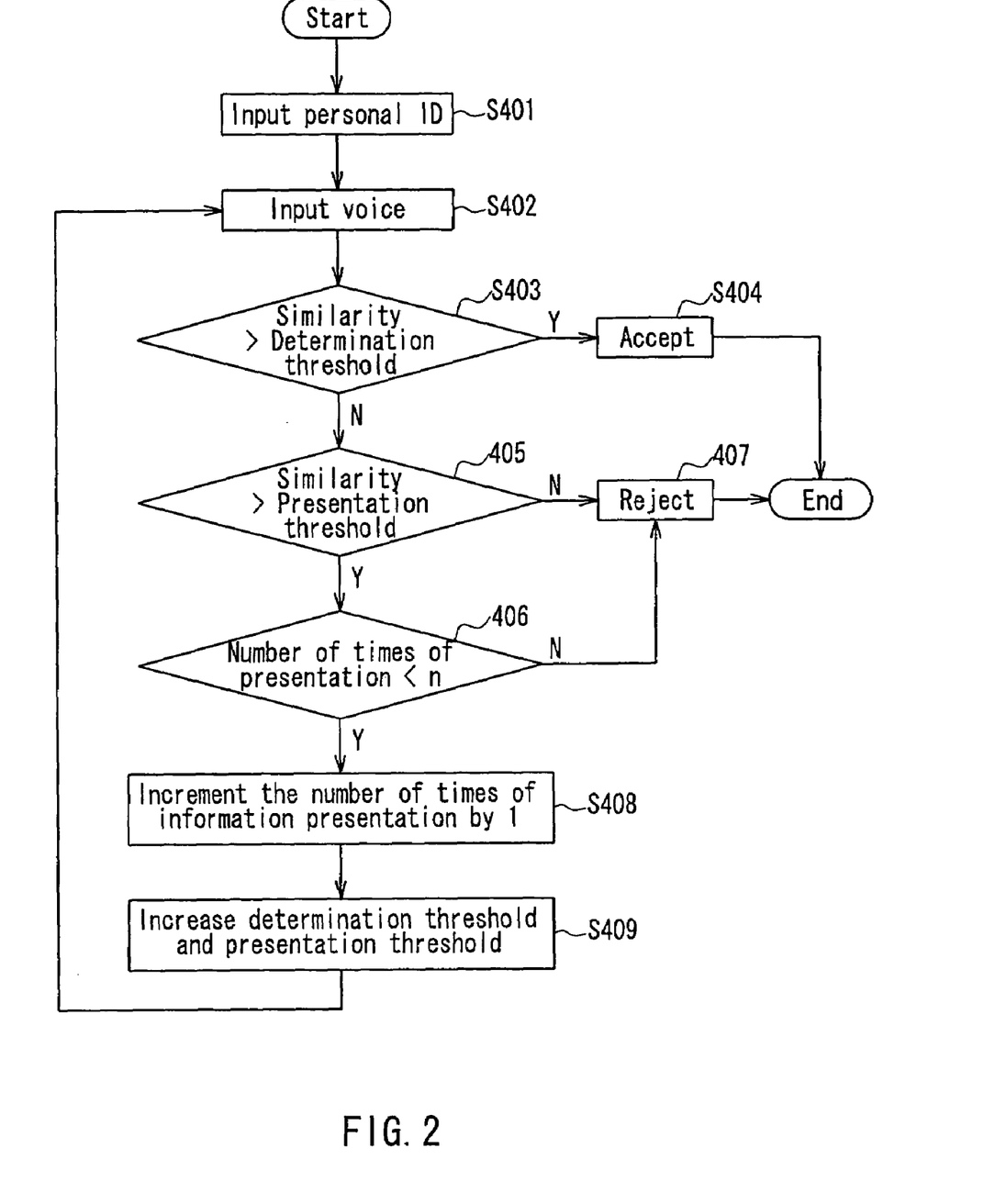
FIG. 2 is a flowchart showing an action of a voice authentication device according to an embodiment of the present invention.

The following describes a procedure of authentication by a voice authentication device of the above-described configuration, while referring to a flowchart of FIG. 2.

The voice authentication device, after performing an initialization process, first provides an instruction such as "Please input ID", to urge a user who intends to be authenticated to input an identifier (personal ID) through the identifier input part 15 (Operation 401). It should be noted that in the foregoing initialization process, a counter indicating the number of times of presentation of presentation-use information is set to 0, and an upper limit of the number of times of presentation of the presentation-use information is set to n (n: natural number). It should be noted the value of n may be set appropriately according to required authentication precision, etc.

Subsequently, the voice authentication device provides an instruction such as "Please speak the keyword", to urge the user to utter the keyword and to input the foregoing voice through the voice input part 11 (Operation 402).

The voice input part 11 transfers the input voice to the feature extraction part 12. The feature extraction part 12 converts the input voice into a time series of feature parameters. Then, the similarity calculation part 13 calculates a similarity of the time series of the feature parameters obtained by the feature extraction part 12 with respect to a standard template corresponding to the personal ID inputted by the user. Further, the determination part 14 compares the similarity obtained by the similarity calculation part 13 with a threshold value preliminarily set for determination (hereinafter referred to as determination threshold value) (Operation 403). Here, the feature parameters obtained by the feature extraction part 12 are, for instance, information of a spectrum envelope of a LPC cepstrum, MFCC, etc.

In the case where the similarity exceeds the determination threshold value (the result of Operation 403: YES), the user who intends to be authenticated is accepted as the authorized user him/herself (Operation 404).

On the other hand, in the case where the similarity is not higher than the determination threshold value (the result of Operation 403: NO), the determination part 14 compares the similarity obtained by the similarity calculation part 13 with a threshold value for presentation (hereinafter referred to as presentation threshold value) (Operation 405). The presentation threshold value is set initially to a value that is lower than the determination threshold value as a reference value for determining whether the user is accepted as the authorized user him/herself, and that evidently indicates the user should be determined to be a person other than the authorized user.

In the case where the similarity is not greater than the presentation threshold value (the result of Operation 405: NO), the user who intends to be authenticated is rejected as a person other than the authorized user (Operation 407), and the authentication procedure with respect to the foregoing user ends.

On the other hand, in the case where the similarity is greater than the presentation threshold value (the result of Operation 405: YES), whether or not the counter value indicating the time of presentation of the presentation-use information is an upper limit n or lower than that (Operation 406) is determined, and if it is the upper limit or lower than that (the result of Operation 406: YES), the presentation-use information extraction part 19 receives, from the registered voice storage part 10, a registered voice corresponding to the personal ID inputted through the identifier input part 15, extracts presentation-use information from the registered voice, and transfers the same to the presentation-use information output part 18. With this, the presentation-use information output part 18 outputs the presentation-use information to the user, and increments the counter indicating the time of presentation of the presentation-use information by 1 (Operation 408). It should be noted that as the presentation-use information to be extracted from a registered voice and outputted at Operation 408, any one of the following, for instance, may be used: (1) a signal containing information of a pitch frequency of the registered voice; (2) a signal containing information of a power of the registered voice; (3) a signal containing a phonetic information of the registered voice; (4) a signal containing information of a speaking rate of the registered voice; and (5) a text describing a speech content of the registered voice.

It should be noted that the timing for presenting the presentation-use information is not limited to the timing after the authentication operation failed once and before the authentication operation is performed again. In other words, the presentation-use information may be presented after a user inputted his/her personal ID and before the first authentication operation is carried out.

Then, the determination threshold value and the presentation threshold value are increased by predetermined values, respectively (Operation 409), and the flow returns to Operation 402, where the user is allowed to input a voice again.

Subsequently, the process from Operation 402 to Operation 409 is repeated until either the user finally is accepted or rejected, or the time of presentation of the presentation-use information exceeds the upper limit n. In the case where the time of presentation of the presentation-use information exceeds the upper limit n (the result of Operation 406: NO), the user is rejected (Operation 407).

It should be noted that the flowchart of FIG. 2 shows a mere example of an action of a voice authentication device as one embodiment of the present invention, and does not limit the present invention. For instance, in this example, the presentation threshold value is set apart from the determination threshold value so that whether the user is rejected or is allowed to input a voice again is determined by referring to the presentation threshold value, but alternatively, without the presentation threshold value being set, the presentation-use information may be presented to the user unconditionally in the case where the user is not accepted, so that the voice input and determination are repeated until the time of presentation reaches the upper limit n. Further, the example shown in FIG. 2 includes the operation (Operation 409) of increasing the determination threshold value and the presentation threshold value before the next voice input is performed, but this operation is not indispensable if the authentication precision is in an acceptable range. Alternatively, weights or the like upon the calculation of similarity may be changed, with the determination threshold value being kept constant.

On the other hand, as an embodiment preferable to the procedure shown in FIG. 2, the procedure may be configured so that in Operation 408 performed the second or subsequent time, presentation-use information of a type different from a type of the presentation-use information having been outputted before is presented. For instance, in the case where a signal containing information of a pitch frequency of a registered voice, i.e., the foregoing (1), is used as the presentation-use information for the first presentation operation, a signal containing information of a power of the registered voice, i.e., the foregoing (2), for instance, may be used as the presentation-use information for the second presentation operation.

Further, it is also preferable that the determination threshold value is varied, not only according to the time of presentation, but also according to the type of the presentation-use information. For instance, in the case where phonetic information, i.e., the foregoing (3), or a text describing a speech content of a registered voice, i.e., the foregoing (5), is outputted as the presentation-use information and the user is urged to input his/her voice again, it is presumed that the similarity of the re-inputted voice to the registered voice tends to improve more easily as compared with the case where another presentation-use information is presented. Therefore, after presentation-use information that tends to cause the similarity to improve easily is outputted, it is preferable to set the determination threshold value relatively higher, so as to avoid a risk of accepting another person.

Further, in the procedure shown in the flowchart of FIG. 2, the presentation-use information is not presented at the time of the first voice input and the user is urged to utter the keyword relying only on the user's memory, but the presentation-use information may be presented at the time of the first voice input, for instance, in the case where the user wishes to have the presentation-use information to be outputted (or unconditionally).

As described above, according to the present embodiment, even if a change of utterance of the user has occurred because of elapse of time since the voice registration or the like, by presenting presentation-use information generated from a registered voice to a user who intends to be authenticated, it is possible to allow the user to imitate the presentation-use information, thereby enabling the user to make utterance close to the registered voice.

It should be noted that even with output of the presentation-use information, this does not necessarily make it easier for another person to be disguised as an authorized user. For instance, even if a person imitates a pitch frequency or the like of a registered voice of another person, his/her voiceprint (information of a spectrum envelope of the voice) does not necessarily become close to the registered voice. However, if an authorized user him/herself imitates the pitch frequency of his/her registered voice or the like, his/her voiceprint can be made close to that of the registered voice. In other words, an increase in the similarity in the case where a person imitates a pitch frequency or the like of his/her own registered voice is larger, as compared with an increase in the similarity in the case where a person imitates a pitch frequency or the like of a registered voice of another person. Therefore, by outputting presentation-use information, it is possible to improve the accuracy of authentication of personal identification, while accurately rejecting the disguise by other persons. However, in the case where particularly high authentication accuracy is required, as described above with reference to FIG. 2, it is preferable to increase the determination threshold value for a voice re-inputted, after presentation-use information is outputted.

EMBODIMENT 2

The following describes Embodiment 2 of the voice authentication device according to the present invention. Since the voice authentication device according to Embodiment 2 has the same configuration as that of FIG. 1 referred to relating to Embodiment 1, detailed descriptions of the same are omitted.

Figure 3:
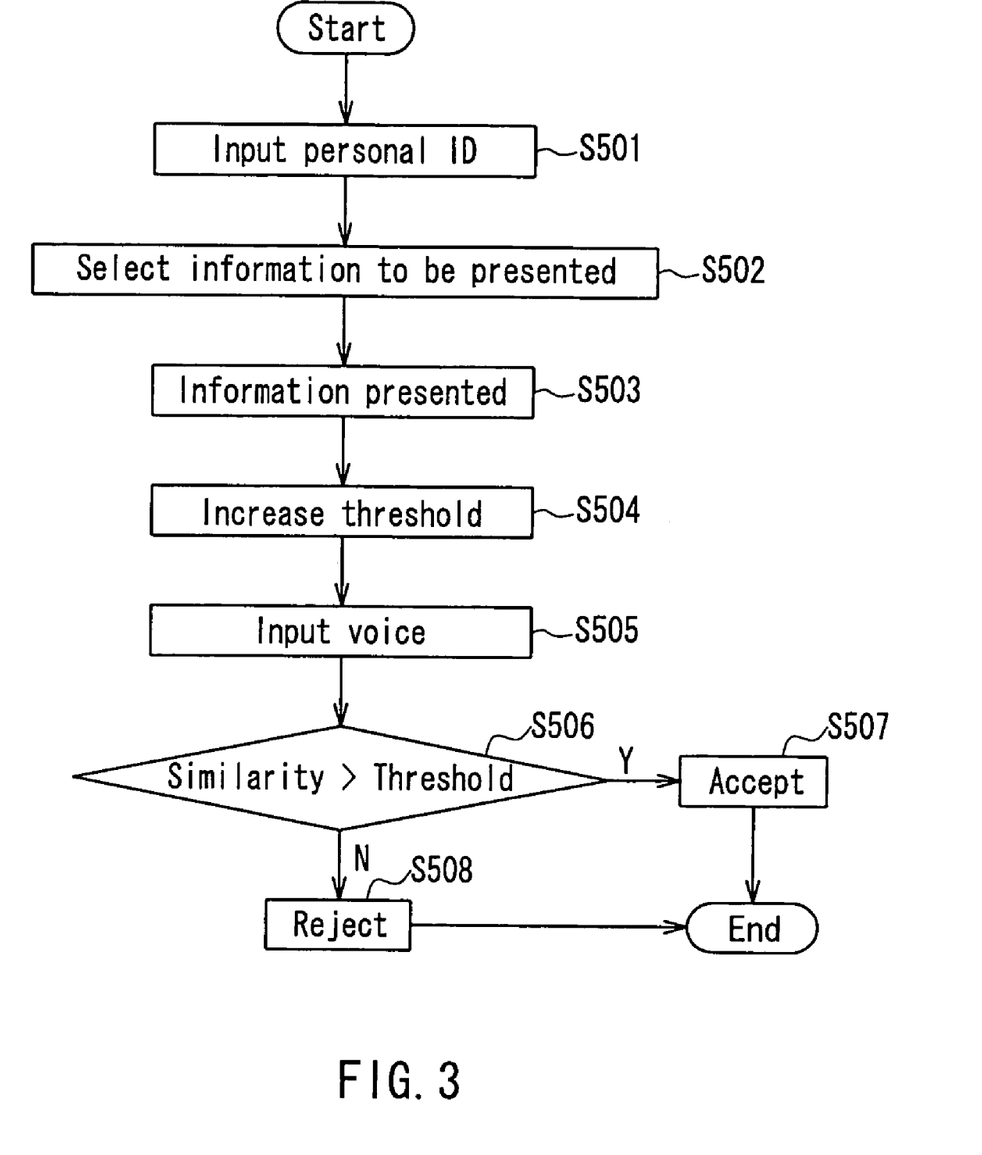
FIG. 3 is a flowchart showing an action of a voice authentication device according to another embodiment of the present invention.

The following describes a procedure of authentication by a voice authentication device according to the present embodiment, while referring to a flowchart of FIG. 3.

The voice authentication device according to the present embodiment first provides an instruction such as "Please input ID", to urge a user who intends to be authenticated to input an identifier (personal ID) through the identifier input part 15 (Operation 501).

Next, the voice authentication device urges the user to select and input a type of presentation-use information that the user wishes is presented (Operation 502). Options of the presentation-use information are, for instance, (1) a signal containing information of a pitch frequency of the registered voice; (2) a signal containing information of a power of the registered voice; (3) a signal containing a phonetic information of the registered voice; (4) a signal containing information of a speaking rate of the registered voice; and (5) a text describing a speech content (keyword) of the registered voice. It should be noted that here the type of the presentation-use information is selected and inputted by the user, but the configuration is not limited to this. The configuration may be such that the type of the presentation-use information is selected by the voice authentication device appropriately.

Subsequently, the presentation-use information extraction part 19 receives, from the registered voice storage part 10, a registered voice corresponding to the personal ID inputted through the identifier input part 15. From the foregoing registered voice, the presentation-use information extraction part 19 extracts presentation-use information of the type selected by the user at Operation 502, and transfers the same to the presentation-use information output part 18. The presentation-use information output part 18 outputs presentation-use information of the type selected by the user (Operation 503).

Thereafter, the determination part 14 increases the determination threshold value to be used at the time of determination from an ordinary value (Operation 504). Here, an amount of the increase preferably is varied according to the type of the presentation-use information selected by the user at Operation 502. For instance, in the case where the presentation-use information of any one of the foregoing types (1) to (5) is used, the amount of the increase of the determination threshold value may be at a maximum level when the phonetic information of the foregoing (3) or the keyword of the foregoing (5) is presented, the amount of the increase may be at a midrange level when the pitch frequency of the foregoing (1)

is presented, and the amount of the increase may be at a minimum level when the speaking rate of the foregoing (4) or the power of the foregoing (2) is presented. This is because the similarity to the registered voice improves most significantly when the phonetic information of the foregoing (3) or the keyword of the foregoing (5) is presented as the presentation-use information and the information is imitated. In this case, unless the determination threshold value is increased by a relatively great amount, a rate of false acceptance of another person rises.

Subsequently, the voice authentication device provides an instruction such as "Please speak the keyword", to urge the user to utter the keyword and to input the foregoing voice through the voice input part 11 (Operation 505).

The voice input part 11 transfers the input voice to the feature extraction part 12. The feature extraction part 12 converts the input voice into a time series of feature parameters. Then, the similarity calculation part 13 calculates a similarity of the time series of the feature parameters obtained by the feature extraction part 12 with respect to a standard template corresponding to the personal ID inputted by the user. Further, the determination part 14 compares the similarity obtained by the similarity calculation part 13 with a determination threshold value (Operation 506). Here also, as the feature parameters obtained by the feature extraction part 12, for instance, information of a spectrum envelope of a LPC cepstrum, MFCC, etc. can be used.

In the case where the similarity exceeds the determination threshold value (the result of Operation 506: YES), the user who intends to be authenticated is accepted as the authorized user him/herself (Operation 507). On the other hand, in the case where the similarity is not higher than the determination threshold value (the result of Operation 506: NO), the determination part 14 rejects the user who intends to be authenticated, determining that the user is not an authorized user (Operation 508).

As described above, according to the procedure shown by the flowchart of FIG. 3, a condition (determination threshold value) for acceptance of a person is changed appropriately according to a content (type) of information to be presented to a user. By so doing, even if another person reproduces utterance close to a voice at the time of registration by referring to the information presented, false acceptance of such another person can be prevented.

It should be noted that the flowchart of FIG. 3 shows a mere example of an action of a voice authentication device as one embodiment of the present invention, and does not limit the present invention. For instance, at Operation 502, an option of "Presentation-use information is unnecessary" may be provided additionally, whereby in the case where a user selects it, the user is allowed to skip Operations 503 and 504 and proceed to Operation 505.

Alternatively, the configuration may be such that, not urging a user to select and input the type of presentation-use information that the user requests, but the presentation-use information extraction part 19 determines the type of presentation-use information to be extracted, according to a predetermined rule or at random, every time or once a several times the presentation-use information is to be extracted.

EMBODIMENT 3

The following describes Embodiment 3 of the voice authentication device according to the present invention. Since the voice authentication device according to Embodiment 3 has the same configuration as that of FIG. 1 referred to relating to Embodiment 1, detailed descriptions of the same are omitted.

Figure 4:
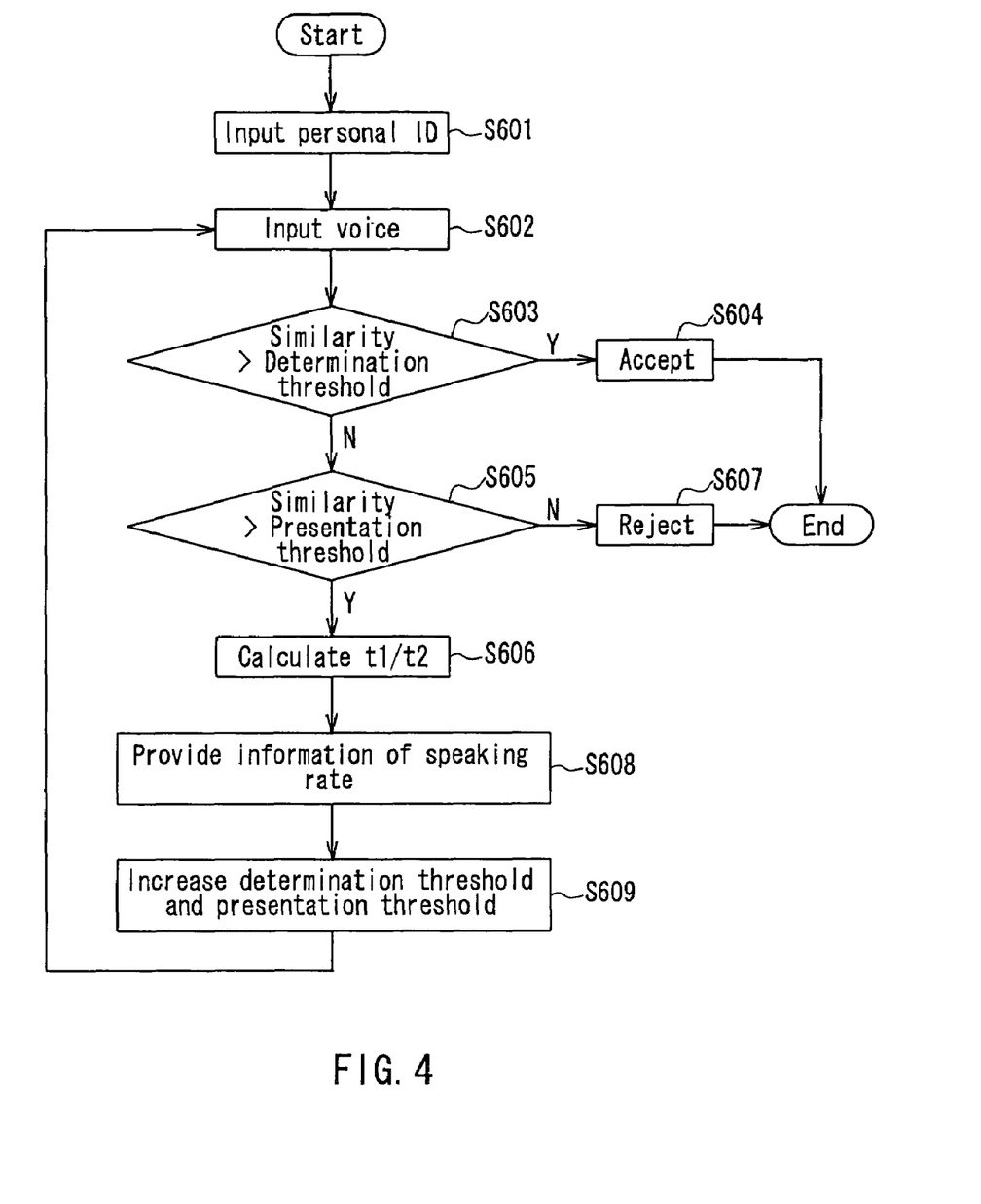
FIG. 4 is a flowchart showing an action of a voice authentication device according to still another embodiment of the present invention.

The following describes a procedure of authentication by a voice authentication device according to the present embodiment, while referring to a flowchart of FIG. 4.

The voice authentication device according to the present embodiment first provides an instruction such as "Please input ID", to urge a user who intends to be authenticated to input an identifier (personal ID) through the identifier input part 15 (Operation 601).

Subsequently, the voice authentication device provides an instruction such as "Please speak the keyword", to urge the user to utter the keyword and to input the foregoing voice through the voice input part 11 (Operation 602).

The voice input part 11 transfers the input voice to the feature extraction part 12. The feature extraction part 12 converts the input voice into a time series of feature parameters. Then, the similarity calculation part 13 calculates a similarity of the time series of the feature parameters obtained by the feature extraction part 12 with respect to a standard template corresponding to the personal ID inputted by the user. Further, the determination part 14 compares the similarity obtained by the similarity calculation part 13 with a determination threshold value that has been preliminarily set (Operation 603). Here, as the feature parameters obtained by the feature extraction part 12, information of a spectrum envelope of a LPC cepstrum, MFCC, etc. can be used.

In the case where the similarity exceeds the determination threshold value (the result of Operation 603: YES), the user who intends to be authenticated is accepted as the authorized user him/herself (Operation 604).

On the other hand, in the case where the similarity is not higher than the determination threshold value (the result of Operation 603: NO), the determination part 14 compares the similarity obtained by the similarity calculation part 13 with the presentation threshold value (Operation 605). The presentation threshold value is set initially to a value that is lower than the determination threshold value as a reference value for determining whether the user is accepted as the authorized user him/herself, and that evidently indicates the user should be determined to be a person other than the authorized user.

In the case where the similarity is not greater than the presentation threshold value (the result of Operation 605: NO), the user who intends to be authenticated is rejected as a person other than the authorized user (Operation 607), and the authentication procedure with respect to the foregoing user ends.

On the other hand, in the case where the similarity is greater than the presentation threshold value (the result of Operation 605: YES), the presentation-use information extraction part 18 calculates a ratio of an uttering length t1 of a registered voice with respect to an uttering length t2 of a voice inputted at Operation 602, that is, t1/t2 (Operation 606). Then, if the ratio t1/t2 is smaller than 1, the presentation-use information output part 18 outputs a message of "Please speak faster", whereas if the ratio t1/t2 is greater than 1, the presentation-use information output part 18 outputs a message of "Please speak more slowly" (Operation 608). It should be noted that here the threshold value for t1/t2 is 1, but this is a mere example, and may be changed variously. For instance, the configuration may be such that in the case where the value of t1/t2 is less than a first threshold value (for instance, 0.8), a message of "Please speak faster" is outputted at Operation 608, while in the case where the value of t1/t2 is not less than a threshold value (for instance, 1.2), a message of "Please speak more slowly" is outputted at Operation 608, and in the case where the value is out of the foregoing ranges, Operation 608 is skipped.

Then, the determination threshold value and the presentation threshold value are increased (Operation 609), and the flow returns to Operation 602, where the user is allowed to input a voice again. Subsequently, the process from Operation 602 to Operation 609 is repeated until either the user finally is accepted or rejected.

Thus, by allowing a user to recognize a difference between a speaking rate of a registered voice and a speaking rate of an input voice at the time of authentication, and to input a voice again, the authentication accuracy can be improved.

It should be noted that the flowchart of FIG. 4 shows a mere example of an action of a voice authentication device as one embodiment of the present invention, and does not limit the present invention. For instance, in this example, a text message relating to the speaking rate as presentation-use information is displayed or sounded out at Operation 608, but the presentation-use information is not limited to such a text message. Further, as described relating to Embodiment 1, the operation for increasing the threshold values (Operation 609) is not indispensable if the authentication precision is in an acceptable range.

Further, in the foregoing description, in the case where the result of Operation 605 is YES, the ratio t1/t2 is calculated at Operation 606, and information of a speaking rate is presented (Operation 608) according to the result of the calculation. However, as modifications of Operations 606 and 608, the following process examples may be proposed.

First, as a first modification, the foregoing process may be such that whether a distance between pitch frequencies is not less than a threshold value is determined at Operation 606, and if it is not less than the threshold value, information of a pitch frequency is presented at Operation 608. That "information of a pitch frequency is presented" at Operation 608 refers to, for instance, that a signal containing information of a pitch frequency of a registered voice is presented, or that a message of "Please speak higher" is outputted. Here, the distance between pitch frequencies refers to a dynamic programming (DP) distance relating to a pitch envelope of an input voice and a pitch envelope of a registered voice.

Further, as a second modification, the foregoing process may be such that whether a distance relating to powers is not less than a threshold value is determined at Operation 606, and if it is not less than the threshold value, information of a power is presented at Operation 608. That "information of a power is presented" at Operation 608 refers to that a signal containing information of a power of a registered voice is outputted, or the like. Here, the distance between powers refers to a DP distance relating to a power envelope of an input voice and a power envelope of a registered voice.

Further, as a third modification, the foregoing process may be such that when voice recognition is performed with respect to a voice inputted at Operation 602, whether or not the recognition result coincides with a keyword is determined at Operation 606, and in the case where it is determined that they do not coincide with each other, phonetic information or the keyword is presented at Operation 608.

It should be noted that in the foregoing embodiments, the voice authentication device incorporates the registered voice storage part that stores registered voices of the authorized users, and necessary presentation-use information is generated upon necessity by the presentation-use information extraction part by fetching necessary information from the registered voice storage part. However, the present invention is not limited to this, and it may be configured so that presentation-use information is generated preliminarily from registered voices of authorized users and stored in an appropriate storage medium in a voice authentication device, and the presentation-use information extraction part extracts presentation-use information corresponding to an identifier of a user from the storage medium. Alternatively, information other than parameters relating to keywords, speaking rates, etc., is produced preliminarily and stored in an appropriate storage medium in a voice authentication device, and the parameters relating to keywords, speaking rates, etc. are generated at the time of authentication.

It should be noted that in the foregoing description, a configuration example with use of hardware is shown in FIG. 1 as an embodiment of the present invention, but there are other aspects of the present invention, which are a program for implementing a voice authentication device, for instance, as shown in FIG. 1 with use of a computer, and a recording medium that stores the foregoing program. In other words, embodiments of the present invention include computer programs for causing a computer to implement the processing procedures as shown in FIGS. 2 to 4 and computer-readable, arbitrary recording media that record the foregoing programs.

INDUSTRIAL APPLICABILITY

As described above, according to the present invention, it is possible to provide a text-dependent voice authentication system that is capable of improving authentication precision by presenting information about a registered voice to a user who intends to be authenticated so as to allow the user to reproduce utterance close to the registered voice at the time of authentication.

The invention claimed is:

1. A voice authentication system, comprising:
 a standard template storage part in which a standard template that is generated from a registered voice of an authorized user and featured with a voice characteristic of the registered voice is stored preliminarily in a state of being associated with an identifier of the authorized user;
 an identifier input part that allows a user who intends to be authenticated to input an identifier;
 a voice input part that allows the user who intends to be authenticated to input a voice;
 a standard template selection part that selects, from the standard template storage part, a standard template corresponding to the identifier inputted through the identifier input part;
 a determination part that refers to the standard template selected by the standard template selection part, and determines whether or not the voice inputted through the voice input part is a voice of the authorized user him/herself and whether or not presentation-use information is to be outputted by referring to a predetermined determination reference;
 a presentation-use information extraction part that extracts information regarding a registered voice of the authorized user corresponding to the identifier inputted through the identifier input part, as presentation-use information to be presented to the user who intends to be authenticated; and
 a presentation-use information output part that outputs the presentation-use information to the user who intends to be authenticated,
 wherein
 the presentation-use information is information obtained from the registered voice of the authorized user corresponding to the identifier inputted through the identifier input part, is different from information used as the determination reference by the determination part, and is other than a text describing a speech content of the registered voice of the authorized user, and in the case where it is determined by the determination part that the presentation-use information is to be outputted, the presentation-use information extraction part extracts the presentation-use information, and the presentation-use information output part outputs the presentation-use information thus extracted.

2. The voice authentication system according to claim 1, wherein
the presentation-use information includes at least one selected from the group consisting of information regarding the voice characteristic of the registered voice of the authorized user corresponding to the identifier inputted through the identifier input part, a signal containing information of a pitch frequency of the registered voice, a signal containing phonetic information of the said registered voice, a signal containing information of a power of the registered voice, and a signal containing information of a speaking rate.

3. The voice authentication system according to claim 1 or 2, wherein
the voice characteristic is information of a spectrum envelope of a voice, and
the predetermined determination reference used by the determination part is the voice characteristic.

4. The voice authentication system according to claim 3, wherein
after the presentation-use information is outputted by the presentation-use information output part to the user, the user is urged to input a voice again through the voice input part, and
when determination is performed again by the determination part based on the voice thus inputted again, a threshold value as the determination reference is set so as to be a predetermined value higher than that at the previous determination.

5. The voice authentication system according to claim 4, wherein
the presentation-use information extraction part selects and extracts presentation-use information to be presented to the user, from a plurality of types of presentation-use information, and
the determination part has determination references corresponding to the types of the presentation-use information, respectively, and alters the determination reference that the determination part refers to, according to the type of the presentation-use information extracted by the presentation-use information extraction part.

6. A voice authentication system according to claim 1, wherein the voice input part receives speech input by the user speaking the identifier.

7. A voice authentication method, comprising:
an operation of allowing a user who intends to be authenticated to input an identifier;
an operation of allowing the user who intends to be authenticated to input a voice;
a determination operation of selecting a standard template corresponding to the inputted identifier, from a standard template storage part in which a standard template that is generated from a registered voice of an authorized user and featured with a voice characteristic of the registered voice is stored preliminarily in a state of being associated with an identifier of the authorized user, referring to the selected standard template, and determining whether or not the inputted voice is a voice of the authorized user him/herself and whether or not presentation-use information is to be outputted by referring to a predetermined determination reference;
a presentation-use information extraction operation of extracting information regarding a registered voice of the authorized user corresponding to the inputted identifier, as presentation-use information to be presented to the user who intends to be authenticated; and
a presentation-use information output operation of outputting the presentation-use information extracted in the presentation-use information extraction operation to the user who intends to be authenticated, in the case where it is determined by the determination operation that the presentation-use information is to be outputted,
wherein
the presentation-use information is information obtained from the registered voice of the authorized user corresponding to the inputted identifier, is different from information used as the determination reference by the determination part, and is other than a text describing a speech content of the registered voice of the authorized user.

8. A voice authentication method according to claim 7,
wherein the determination operation determines whether the inputted voice is the voice of the authorized user by testing whether the inputted voice reaches a first threshold of similarity when compared to the registered voice; and
wherein said method further comprises outputting the presentation-use information when the inputted voice exceeds a second threshold of similarity, lower than the first threshold, when compared to the registered voice.

9. A computer-readable recording medium in which a computer program is recorded, the computer program comprising an instruction for causing a computer to execute:
an operation of allowing a user who intends to be authenticated to input an identifier;
an operation of allowing the user who intends to be authenticated to input a voice;
a determination operation of selecting a standard template corresponding to the inputted identifier, from a standard template storage part in which a standard template that is generated from a registered voice of an authorized user and featured with a voice characteristic of the registered voice is stored preliminarily in a state of being associated with an identifier of the authorized user, referring to the selected standard template, and determining whether or not the inputted voice is a voice of the authorized user him/herself and whether or not presentation-use information is to be outputted by referring to a predetermined determination reference;
a presentation-use information extraction operation of extracting information regarding a registered voice of the authorized user corresponding to the inputted identifier, as presentation-use information to be presented to the user who intends to be authenticated; and
a presentation-use information output operation of outputting the presentation-use information extracted in the presentation-use information extraction operation to the user who intends to be authenticated, in the case where it is determined by the determination operation that the presentation-use information is to be outputted,
wherein
the presentation-use information is information obtained from the registered voice of the authorized user corresponding to the inputted identifier, is different from information used as the determination reference by the determination part, and is other than a text describing a speech content of the registered voice of the authorized user.

* * * * *